United States Patent [19]
Kim et al.

[11] Patent Number: 5,867,471
[45] Date of Patent: Feb. 2, 1999

[54] OPTICAL RECORDING AND REPRODUCING APPARATUS HAVING DEVICE FOR CORRECTING POSITION OF SPINDLE MOTOR

[75] Inventors: Seung-min Kim, Suwon; Young-sun Seo, Seongnam, both of Rep. of Korea

[73] Assignee: Samsung Electronics Co., Ltd., Tokyo, Japan

[21] Appl. No.: 723,567

[22] Filed: Sep. 30, 1996

[30] Foreign Application Priority Data

Apr. 23, 1996 [KR] Rep. of Korea .................. 1996-12405
Apr. 23, 1996 [KR] Rep. of Korea .................. 1996-12406

[51] Int. Cl.[6] ............................. G11B 23/00; G11B 7/00
[52] U.S. Cl. ....................................... 369/258; 369/44.32
[58] Field of Search ............................... 369/75.1, 78.1, 369/79.1, 44.32, 75.2; 250/201.5, 201.6; 310/89, 67 R, 68 R; 360/76, 77.01, 70, 71, 72.1, 77.02, 77.03, 78.04, 78.01

[56] References Cited

U.S. PATENT DOCUMENTS 3,673,583 6/1972 Wirth ................................ 340/174.1
5,453,972 9/1995 Kanazawa et al. ..................... 369/219

FOREIGN PATENT DOCUMENTS 7309717 10/1974 France .
1-279459 11/1989 Japan .
2-141959 5/1990 Japan .
2137797 10/1984 United Kingdom .

*Primary Examiner*—Allen T. Cao
*Assistant Examiner*—Kenneth W Fields
*Attorney, Agent, or Firm*—Sughrue, Mion, Zinn, Macpeak & Seas, PLLC

[57] ABSTRACT

An optical recording and reproducing apparatus includes a deck, a spindle motor supported by the deck, a turntable combined with the shaft of the spindle motor, and a corrector for moving the spindle motor horizontally with respect to the surface of the deck in order to adjust the position of the turntable. Accordingly, the tracking error is easily corrected, thereby improving the performance of the apparatus.

12 Claims, 6 Drawing Sheets

OPTICAL RECORDING AND REPRODUCING APPARATUS HAVING DEVICE FOR CORRECTING POSITION OF SPINDLE MOTOR

BACKGROUND OF THE INVENTION

The present invention relates to an optical recording and reproducing apparatus and, more particularly, to an optical recording and reproducing apparatus which can prevent a tracking error by correcting the position of a spindle motor which rotates a turntable.

The optical recording and reproducing apparatus is for reproducing the information recorded in optical recording media (which are referred to as a disk hereinafter) such as a compact disk, digital video disk, and a laser disk. A disk is loaded on the turntable installed in the optical recording and reproducing apparatus and rotates. An optical pickup detects an optical signal from a pit formed in the disk.

FIG. 1 is a perspective view schematically showing a portion of a conventional optical recording and reproducing apparatus. As shown in FIG. 1, an optical recording and reproducing apparatus 10 comprises a deck 11, a turntable 12 on which a disk (not shown) is loaded, a spindle motor 13 for rotating the turntable 12, an optical pickup 14 movable in a rectilinear and reciprocating manner on the deck 11, a motor 15 for driving an optical pickup 14, and a screw shaft 16 for converting the rotational movement of the motor 15 into rectilinear movement. The optical pickup 14, having a tooth gear portion (not shown) formed in one side thereof and engaged with the screw shaft 16, moves along guide shafts 17 fixed to the deck 11, according to the rotation of the screw shaft 16.

In the optical recording and reproducing apparatus having the above construction, focusing and tracking are performed in order to make the laser beam, incident on the disk, correctly land on a pit (not shown) formed in a track of the disk. While focusing is performed in a perpendicular direction to the disk, tracking is performed in the radial direction of the disk by a so-called three beam method. Using the three beam method, a tracking error is detected by comparing the light quantity of the main beam incident on the pit with that of the beams respectively incident on both sides of the pit.

Generally, since a tracking error is generated in the case where the machining precision of the parts is low or the assembly of the parts is poor, there were no alternatives but to improve the precision of machining of the parts and to assemble the parts correctly in order to decrease or prevent the tracking error. Therefore, an apparatus for effectively removing the tracking error is not provided when the tracking error occurs. Furthermore, when allowances of the parts are accumulated during assembly, means for compensating for the same is required after completing the assembly of the parts.

SUMMARY OF THE INVENTION

It is an object of the present invention to provide an optical recording and reproducing apparatus equipped with means for correcting the position of a spindle motor in order to remove a tracking error after completing the assembly thereof.

To achieve the above object, there is provided an optical recording and reproducing apparatus, comprising a deck defining a surface, a spindle motor supported by the deck and having a shaft, a turntable combined with the shaft of the spindle motor, and correcting means for moving the spindle motor horizontally with respect to the surface of the deck in order to adjust a position of the turntable.

The correcting means preferably comprises a motor housing, for housing the spindle motor, having a plurality of horizontal protrusions formed on an outside surface thereof and a vertical protrusion formed on a bottom thereof, and a correcting cam rotatably installed on a lower surface of the deck and having a cam groove in which the vertical protrusion is inserted, and wherein the deck includes a plurality of grooves in which the horizontal protrusions are movably inserted.

Alternatively, the correcting means preferably comprises a plurality of horizontal protrusions directly extended from an outer surface of the spindle motor, a vertical protrusion directly extended from a bottom of the spindle motor, and a correcting cam rotatably installed on a lower surface of the deck and having a cam groove in which the vertical protrusion is inserted, and wherein the deck includes a plurality of grooves in which the horizontal protrusions are movably inserted.

Further still, the correcting means preferably comprises a motor housing, for housing the spindle motor, having a plurality of horizontal protrusions formed on an outer surface thereof and a vertical protrusion formed on a bottom thereof, a lever rotatably installed on a lower surface of the deck and having a slot in which the vertical protrusion is inserted, and a correcting disk, rotatably installed on the lower surface of the deck, for rotating the lever, and wherein the deck includes a plurality of grooves in which the horizontal protrusions are movably inserted.

BRIEF DESCRIPTION OF THE DRAWINGS

The above objects and advantages of the present invention will become more apparent by describing in detail preferred embodiments thereof with reference to the accompanying drawings, in which.

DETAILED DESCRIPTION OF THE PREFERRED EMBODIMENTS

Figure 1:
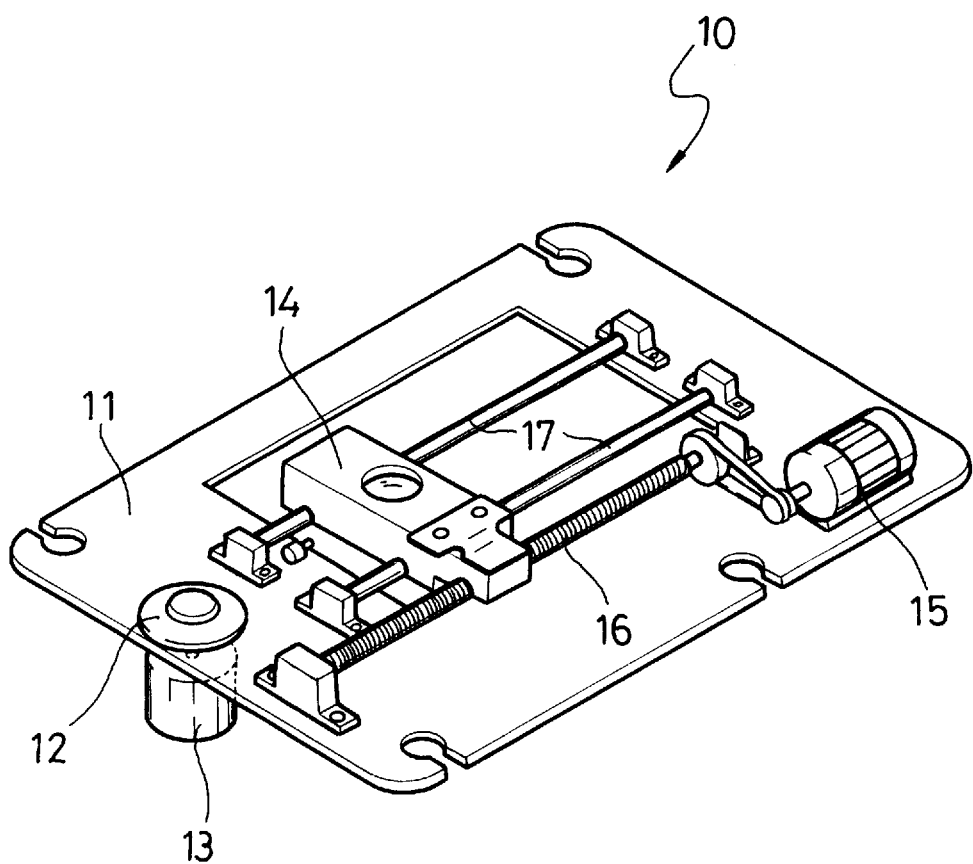
FIG. 1 is a schematic partial perspective view of a conventional optical recording and reproducing apparatus.
Figure 2:
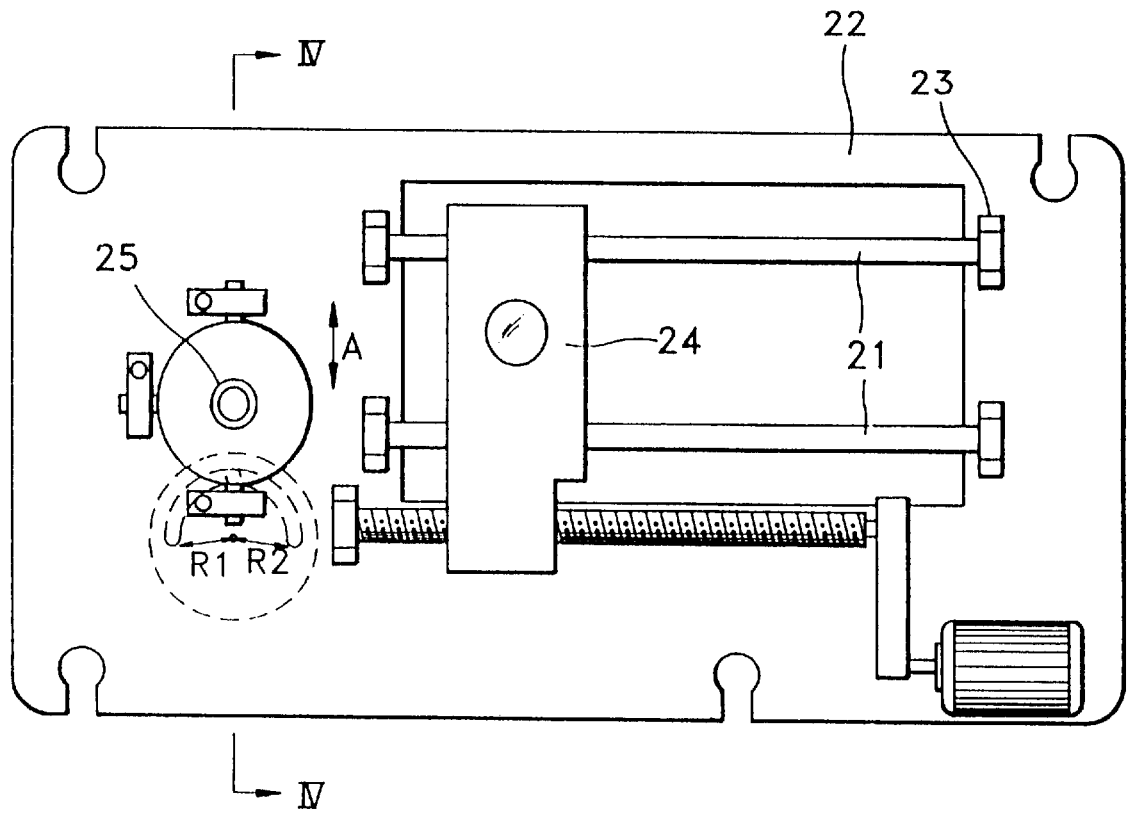
FIG. 2 is a partial plan view showing an embodiment of an optical recording and reproducing apparatus according to the present invention.
Figure 4:
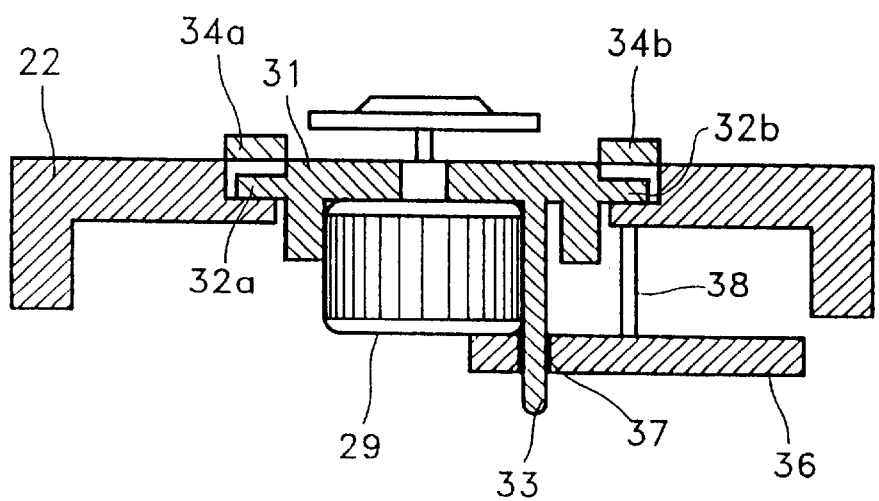
FIG. 4 is a sectional view taken along the line IV–IV of FIG. 2.

The embodiments of the present invention are described in detail with reference to the attached drawings, hereinafter. FIG. 2 is a schematic plan view of a portion of an optical recording and reproducing apparatus according to an embodiment of the present invention. Referring to the drawing, guide shafts 21 are installed on a deck 22 by a fixing portion 23 and an optical pickup 24 is supported so as to move along the guide shafts 21. To one side of the optical pickup 24, a spindle motor 29 (see FIG. 4) is installed and a turntable 25 is combined with the rotating shaft of the spindle motor.

Figure 3:
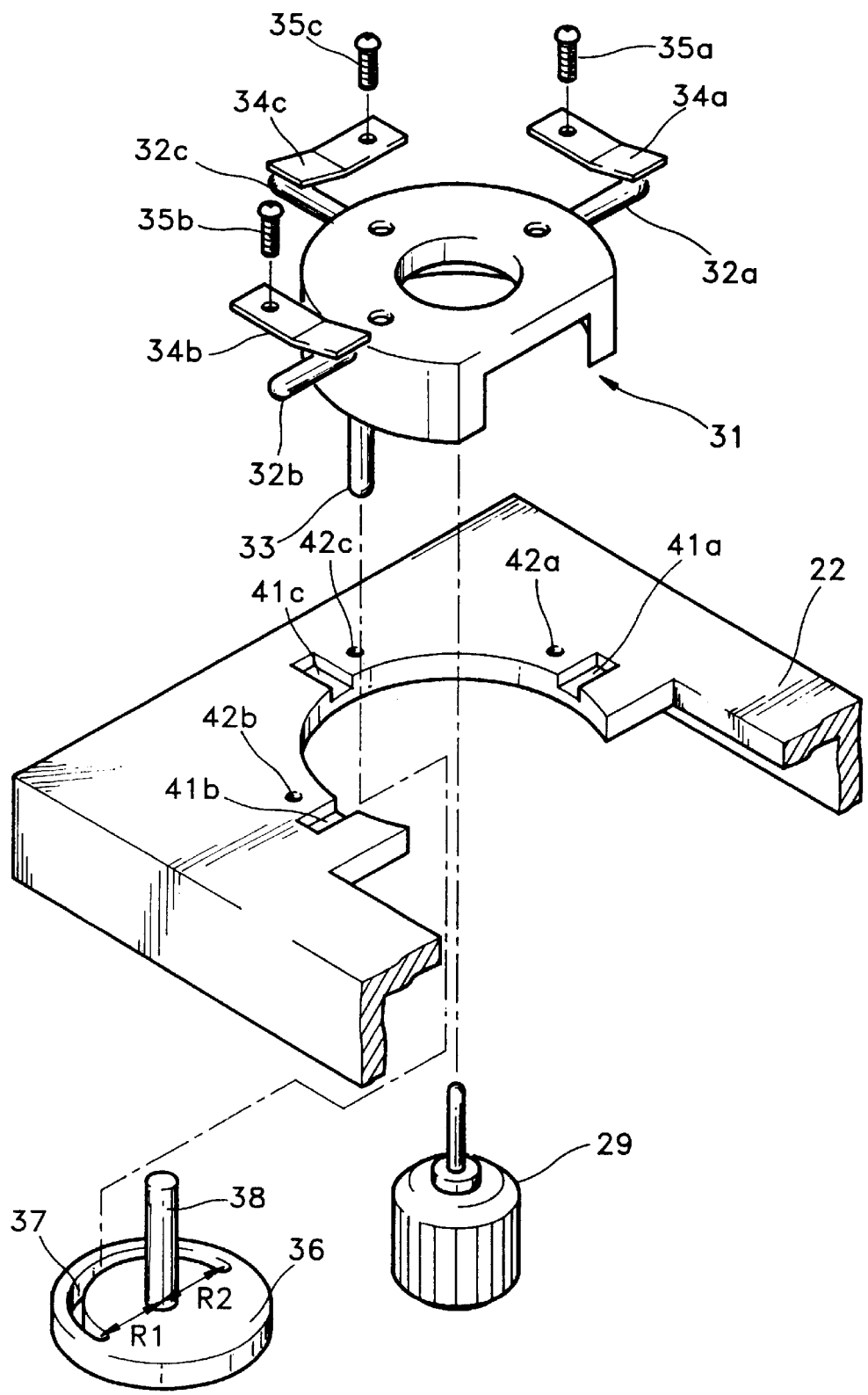
FIG. 3 is a schematic exploded perspective view showing the combining portion of a deck and a spindle motor of the optical recording and reproducing apparatus shown in FIG. 2.

According to a feature of the present invention, the spindle motor 29 supported by the deck 22 and the turntable 25, which is rotated by the spindle motor 29, move in the direction marked with the arrow A of FIG. 2 by the rotation of a correcting cam 36, thus the positions thereof can be corrected. The direction marked with the arrow A is perpendicular to the moving direction of the optical pickup 24. The construction of the spindle motor and the correcting cam 36 are described in detail with reference to FIGS. 3 and 4. Referring to the drawings, the spindle motor 29 is supported by the deck 22 by means of a motor housing 31. The motor housing 31 is generally cylinder-shaped in order to house the spindle motor 29 inside thereof. On the outside of the cylinder, three horizontal protrusions 32a, 32b, and 32c are formed. The protrusions 32a and 32b are spaced at angles of 90 degrees with respect to protrusion 32c. Also, a vertical protrusion 33 is formed in one side of the bottom of the motor housing 31. The spindle motor 29 can be retained in the motor housing 31 using a screw, etc. The cross sections of the horizontal protrusions 32a, 32b, and 32c and the vertical protrusion 33 are preferably circular.

The motor housing 31 can be installed in the deck 22 by inserting the horizontal protrusions 32a, 32b, and 32c into corresponding grooves 41a, 41b, and 41c formed in the deck 22. The upper portions of the grooves 41a, 41b, and 41c in which the horizontal protrusions 32a, 32b, and 32c are inserted are closed by brackets 34a, 34b, and 34c which are fixed by screws 35a, 35b, and 5c combined with screw holes 42a, 42b, and 42c. The brackets 34a, 34b, and 34c are preferably plate springs. In a further embodiment, the groove 41b may be a hole which is horizontally defined on the deck. The opening of the hole faces the opening for receiving the motor housing 31, so that the protrusion 32b can be inserted into the hole by moving the motor housing 31 horizontally. The grooves 41a, 41b, and 41c are formed to have sizes which allow the horizontal protrusions 32a, 32b, and 32c of the motor housing 31 inserted therein to move in minute, even motions.

The vertical protrusion 33 formed on the bottom of the motor housing 31 is inserted in a cam groove 37 of the correcting cam 36. The correcting cam 36 is installed on the bottom of the deck 22 so as to rotate around a shaft 38. As an alternative, the shaft 38 and the deck 22 may be formed as one body or piece and the correcting cam 36 may be rotatably mounted to the shaft 38.

The cam groove 37 is formed on the correcting cam 36 in a semi-circular form in which the radius thereof changes from R1 to R2, the radius of R2 being larger than that of R1, and moves the motor housing 31 in the direction marked with the arrow A as shown in FIG. 2, when the correcting cam 36 rotates. The rut or cut out of the cam groove 37 may be designed to have another form as needed.

The above magnetic recording and reproducing apparatus can control the tracking error by rotating the correcting cam 36. The correcting cam 36 is rotated until the tracking error reaches the limitations within an allowable scope, being checked whether a tracking error is generated or not through a measuring device (not shown). For example, when the correcting cam 36 shown in FIG. 2 rotates in a clockwise direction, the vertical protrusion 33 of the motor housing 31 (FIG. 3) slides from the radius R2 portion to the radius R1 portion along the cam groove 37, to thereby be in a rectilinear motion toward the shaft 38 of the correcting cam 36. In this state, when the correcting cam 36 again rotates in a counter-clockwise direction, the vertical protrusion 33 moves away from the shaft 38 of the correcting cam 36 by sliding from the radius R1 portion to the radius R2 portion along the cam groove 37. Therefore, the positions of the spindle motor 29 housed in the motor housing 31 and the turntable 25 (FIG. 2) fixed to the spindle motor 29 can be adjusted, thereby correcting the tracking error.

According to the present invention, a device for rotating the correcting cam 36 may be provided. For example, a tooth gear portion can be formed on the circumference of the correcting cam 36 and a correcting member (not shown) having a gear meshed therewith, can be installed.

Figure 5:
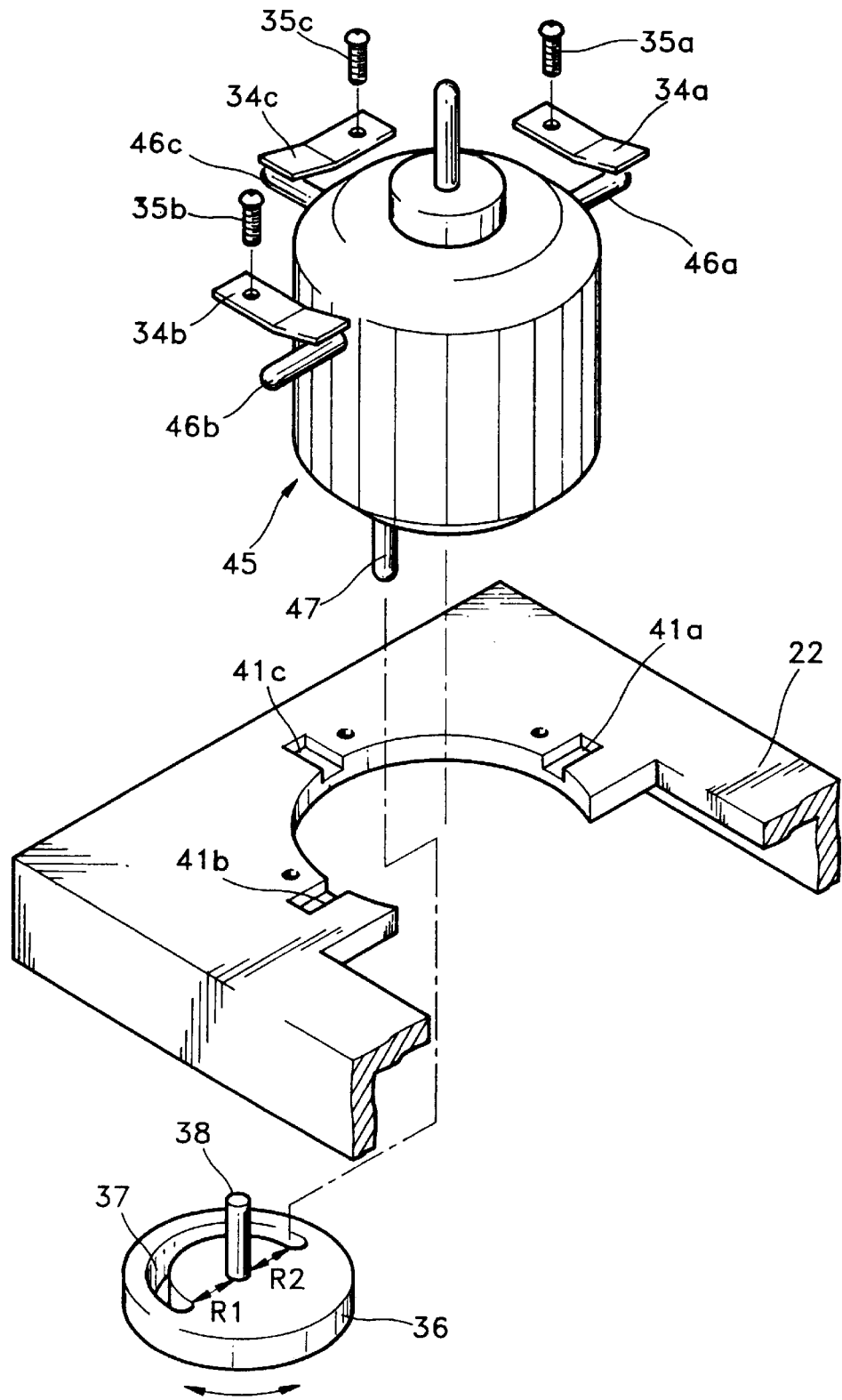
FIG. 5 is a exploded perspective view showing another embodiment of the combining portion of the deck and the spindle motor of FIG. 3.

Another embodiment of the combining portion of the deck and the spindle motor is shown in FIG. 5. The same reference numerals as those of FIG. 3 indicate like elements. Referring to the drawing, horizontal protrusions 46a, 46b, and 46c are formed directly on the circumference of a spindle motor 45. Also, a vertical protrusion 47 is formed on the bottom of the spindle motor 45. The respective horizontal protrusions 46a, 46b, and 46c are inserted in the corresponding grooves 41a, 41b, and 41c. The vertical protrusion 47 is inserted into the cam groove 37 of the correcting cam 36. The grooves 41a, 41b, and 41c in which the horizontal protrusions 46a, 46b, and 46c are inserted are closed by the brackets 34a, 34b, and 34c which are fixed by the screws 35a, 35b, and 35c.

As mentioned above, when the correcting cam 36 rotates, the vertical protrusion 47 of the spindle motor 45 continuously slides along the cam groove 37 having a different radius, thus the positions of the spindle motor 45 and the turntable 25 (FIG. 2), which is combined with the spindle motor 45, can be adjusted in this embodiment like in the previous embodiment.

Figure 6:
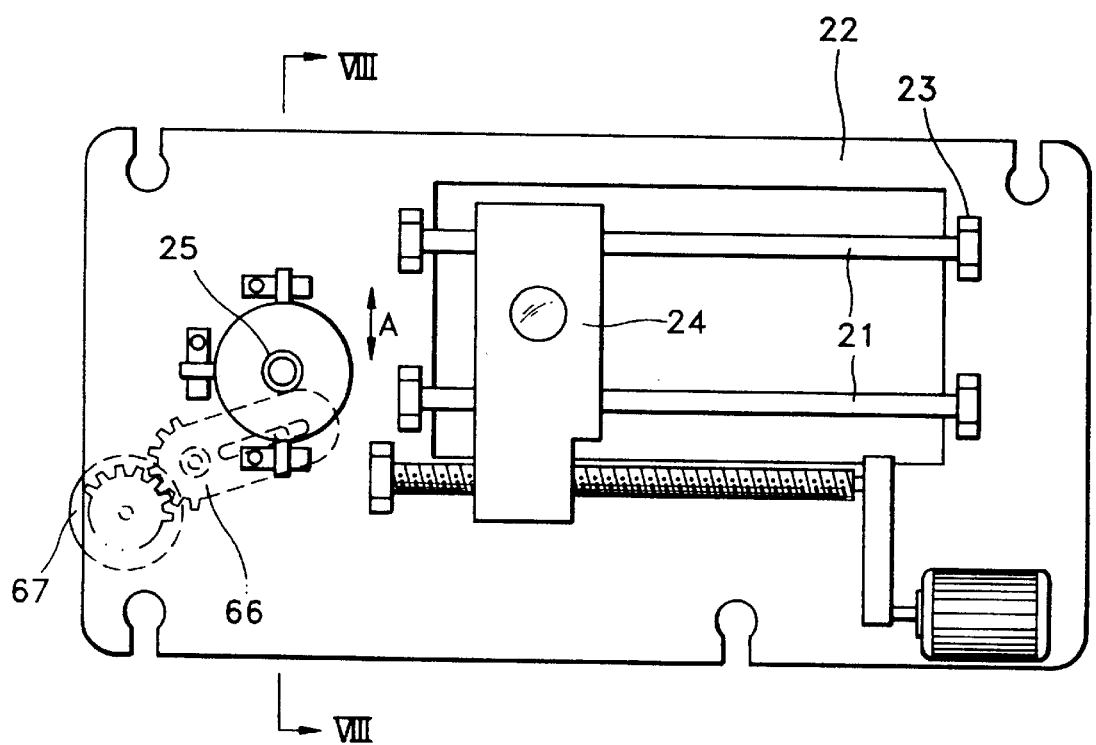
FIG. 6 is a partial plan view showing another embodiment of the optical recording and reproducing apparatus according to the present invention.
Figure 7:
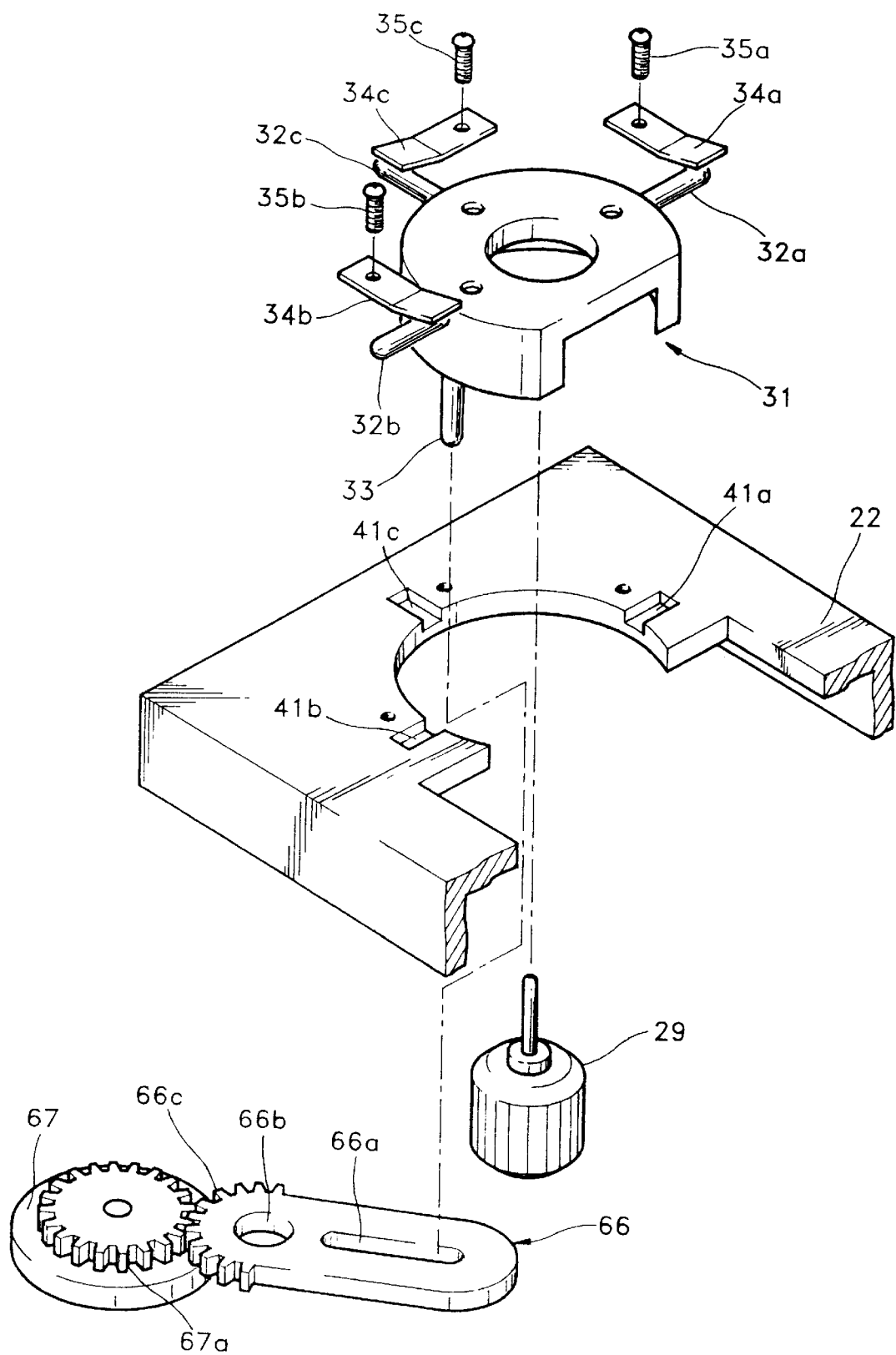
FIG. 7 is a schematic exploded perspective view showing the combining portion of the deck and the spindle motor of the optical recording and reproducing apparatus shown in FIG. 6.

In FIGS. 6 and 7, an optical recording and reproducing apparatus according to another embodiment of the present invention is shown. The same reference numerals as those of FIG. 2 indicate like elements having identical functions.

Referring to the drawings, a lever 66 and a correcting disk 67 are rotatably installed on the lower surface of the deck 22. A gear portion 66c and a gear 67a meshed therewith are formed on the lever 66 and the correcting disk 67, respectively.

The vertical protrusion 33 formed on the bottom of the motor housing 31 is inserted in a slot 66a of the lever 66. The lever 66 is combined to the deck 22 by inserting a boss (not shown) formed on the bottom of the deck 22 in a rotation hole 66b. The correcting disk 67 is also rotatably combined to another boss (not shown) extended from the lower surface of the deck 22.

In correcting the tracking error, the correcting disk 67 is rotated until the error reaches the limitations within the allowable scope. The rotation of the correcting disk 67 is transmitted to the lever 66 through the gear portion 66c and the gear 67a. The vertical protrusion 33 inserted into the slot 66a of the lever 66 slides along the slot 66a and is in a rectilinear and reciprocating motion according to the rotation of the lever 66, thereby the motor housing 31 minutely moves in the direction marked with the arrow A as shown in FIG. 6. Therefore, the positions of the spindle motor 29 and the turntable 25 can be adjusted, so that the tracking error can be corrected.

The optical recording and reproducing apparatus according to the present invention can easily correct the tracking error, thus improving the performance thereof. Especially, the correction of such a tracking error is performed by adjusting the position of the spindle motor, thereby reducing the burden of developing and machining the parts since the same does not depend on the precision of the parts.

The present invention is not restricted to the above embodiments, and it is clearly understood that many variations are possible within the spirit and scope of the present invention by anyone skilled in the art.

What is claimed is:

1. An optical recording and reproducing apparatus, comprising:

a deck defining a surface;

an optical pickup movably supported for horizontal movement in a moving direction with respect to the surface of said deck;

a spindle motor supported by said deck and having a shaft;

a turntable combined with said shaft of said spindle motor; and means for correcting a tracking error by moving said spindle motor horizontally with respect to the surface of said deck and perpendicularly with respect to the moving direction of said optical pickup in order to adjust a position of said turntable, wherein said correcting means comprises:

a motor housing, for housing said spindle motor, having a plurality of horizontal protrusions formed on an outside surface thereof and a vertical protrusion formed on a bottom thereof; and a correcting cam rotatably installed on a lower surface of said deck and having a cam groove in which said vertical protrusion is inserted, and wherein said deck includes a plurality of grooves in which said horizontal protrusions are movably inserted.

2. The optical recording and reproducing apparatus as claimed in claim 1, wherein said cam groove is shaped so as to make said motor housing be in a rectilinear and reciprocating motion with respect to the surface of said deck by the rotation of said correcting cam.

3. The optical recording and reproducing apparatus as claimed in claim 1, further comprising brackets for respectively closing said grooves of said deck in which said horizontal protrusions are inserted.

4. An optical recording and reproducing apparatus, comprising:

a deck defining a surface;

an optical pickup movably supported for horizontal movement in a moving direction with respect to the surface of said deck;

a spindle motor supported by said deck and having a shaft;

a turntable combined with said shaft of said spindle motor; and means for correcting a tracking error by moving said spindle motor horizontally with respect to the surface of said deck and perpendicularly with respect to the moving direction of said optical pickup in order to adjust a position of said turntable, wherein said correcting means comprises:

a plurality of horizontal protrusions directly extended from an outer surface of said spindle motor;

a vertical protrusion directly extended from a bottom of said spindle motor; and a correcting cam rotatably installed on a lower surface of said deck and having a cam groove in which said vertical protrusion is inserted, and wherein said deck includes a plurality of grooves in which said horizontal protrusions are movably inserted.

5. The optical recording and reproducing apparatus as claimed in claim 4, wherein said cam groove is shaped so as to make said spindle motor be in a rectilinear and reciprocating motion with respect to the surface of said deck by the rotation of said correcting cam.

6. The optical recording and reproducing apparatus as claimed in claim 4, further comprising brackets for respectively closing said grooves of said deck in which said horizontal protrusions are inserted.

7. An optical recording and reproducing apparatus, comprising:

a deck defining a surface;

an optical pickup movably supported for horizontal movement in a moving direction with respect to the surface of said deck;

a spindle motor supported by said deck and having a shaft;

a turntable combined with said shaft of said spindle motor; and means for correcting a tracking error by moving said spindle motor horizontally with respect to the surface of said deck and perpendicularly with respect to the moving direction of said optical pickup in order to adjust a position of said turntable, wherein said correcting means comprises:

a motor housing, for housing said spindle motor, having a plurality of horizontal protrusions formed on an outer surface thereof and a vertical protrusion formed on a bottom thereof;

a lever rotatably installed on a lower surface of said deck and having a slot in which said vertical protrusion is inserted; and a correcting disk, rotatably installed on the lower surface of said deck, for rotating said lever, and wherein said deck includes a plurality of grooves in which said horizontal protrusions are movably inserted.

8. The optical recording and reproducing apparatus as claimed in claim 7, wherein said slot is shaped so as to make said motor housing be in a rectilinear and reciprocating motion with respect to the surface of said deck by the rotation of said correcting cam.

9. The optical recording and reproducing apparatus as claimed in claim 7, further comprising brackets for respectively closing said grooves of said deck in which said horizontal protrusions are inserted.

10. An optical recording and reproducing apparatus, comprising:

a deck defining a surface;

a spindle motor supported by said deck and having a shaft;

a turntable combined with said shaft of said spindle motor; and a correcting mechanism which corrects a tracking error by moving said spindle motor horizontally with respect to the surface of said deck in order to adjust a position of said turntable, wherein said correcting mechanism comprises:

a motor housing, for housing said spindle motor, having a plurality of horizonal protrusions formed on an outside surface thereof and a vertical protrusion formed on a bottom thereof; and a correcting cam rotatably installed on a lower surface of said deck and having a cam groove in which said vertical protrusion is inserted, and wherein said deck includes a plurality of grooves in which said horizontal protrusions are movably inserted.

11. An optical recording and reproducing apparatus, comprising:

a deck defining a surface;

a spindle motor supported by said deck and having a shaft;

a turntable combined with said shaft of said spindle motor; and a correcting mechanism which corrects a tracking error by moving said spindle motor horizontally with respect to the surface of said deck in order to adjust a position of said turntable, wherein said correcting mechanism comprises:

a plurality of horizontal protrusions directly extended from an outer surface of said spindle motor;

a vertical protrusion directly extended from a bottom of said spindle motor; and a correcting cam rotatably installed on a lower surface of said deck and having a cam groove in which said vertical protrusion is inserted, and wherein said deck includes a plurality of grooves in which said horizontal protrusions are movably inserted.

12. An optical recording and reproducing apparatus, comprising:

a deck defining a surface;

a spindle motor supported by said deck and having a shaft;

a turntable combined with said shaft of said spindle motor; and a correcting mechanism which corrects a tracking error by moving said spindle motor horizontally with respect to the surface of said deck in order to adjust a position of said turntable, wherein said correcting mechanism comprises:

a motor housing, for housing said spindle motor, having a plurality of horizontal protrusions formed on an outer surface thereof and a vertical protrusion formed on a bottom thereof;

a lever rotatably installed on a lower surface of said deck and having a slot in which said vertical protrusion is inserted; and a correcting disk, rotatably installed on the lower surface of said deck, for rotating said lever, and wherein said deck includes a plurality of grooves in which said horizontal protrusions are movably inserted.

* * * * *